US012794987B2

(12) United States Patent
Sugiura

(10) Patent No.: US 12,794,987 B2
(45) Date of Patent: Nov. 10, 2026

(54) SYSTEM INCLUDING FIRST DEVICE AND SECOND DEVICE CONFIRMING WHETHER FIRST DEVICE HAS COMPLETED CONNECTION WITH SERVER

(71) Applicant: BROTHER KOGYO KABUSHIKI KAISHA, Nagoya (JP)

(72) Inventor: Masatoshi Sugiura, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 310 days.

(21) Appl. No.: 18/583,028

(22) Filed: Feb. 21, 2024

(65) Prior Publication Data

US 2024/0291894 A1 Aug. 29, 2024

(30) Foreign Application Priority Data

Feb. 27, 2023 (JP) ................................ 2023-028984

(51) Int. Cl.
*H04L 67/141* (2022.01)

(52) U.S. Cl.
CPC ................................ *H04L 67/141* (2013.01)

(58) Field of Classification Search
None
See application file for complete search history.

(56) References Cited

U.S. PATENT DOCUMENTS

2006/0075092 A1* 4/2006 Kidokoro .............. H04L 69/329 709/224
2012/0086980 A1* 4/2012 Numata ................ G06F 3/1232 358/1.15
2017/0093985 A1* 3/2017 Kouno .................. H04L 67/141
2019/0012123 A1* 1/2019 Takahashi ............. G06F 3/1238
2023/0291642 A1* 9/2023 Haapanen ............... H04L 41/12

FOREIGN PATENT DOCUMENTS

JP 2013-129146 A 7/2013

* cited by examiner

*Primary Examiner* — Tonia L Dollinger
*Assistant Examiner* — Ishrat Rashid
(74) *Attorney, Agent, or Firm* — Merchant & Gould P.C.

(57) ABSTRACT

A system includes a sever and a plurality of devices including a first device and a second device. The second device is configured to perform: confirming, in a state where the second device has completed a connection with the server, whether each of one or more devices of the plurality of devices has completed a connection with the server; and transmitting, when the first device is in a specific state in which the first device has not completed a connection with the server, first device identification information and first status information of the first device to the server. The server is configured to perform: storing, in response to acquiring the first device identification information and first status information from the second device, the acquired first device identification information and first status information in a storage device of the server in association with administrator identification information associated with the second device.

10 Claims, 8 Drawing Sheets

FIG. 3

D3

| DEVICE IDENTIFICATION INFORMATION IDD | SERVICE INFORMATION SI | CONNECTION STATUS ST | REGISTERING DEVICE RID | ADMINISTRATOR IDENTIFICATION INFORMATION IDA | |
|---|---|---|---|---|---|
| – → IDD1 | SI1 | – → COMPLETE | – → IDD1 | IDA1 | R1 ← S200@1 |
| – → IDD2 | SI2 | – → COMPLETE | – → IDD2 | IDA1 | R2 ← S230 |
| – → IDD3 | SI3 | – → COMPLETE | – → IDD3 | IDA1 | R3 ← S200@3 |
| ⋮ | ⋮ | ⋮ | ⋮ | ⋮ | |
| – | SI21 | – | – | IDA2 | |
| – | SI21 | – | – | IDA2 | |
| ⋮ | ⋮ | ⋮ | ⋮ | ⋮ | |
| IDD1 | – | INCOMPLETE | IDD2 | IDA1 | RL ← S390 |

SYSTEM INCLUDING FIRST DEVICE AND SECOND DEVICE CONFIRMING WHETHER FIRST DEVICE HAS COMPLETED CONNECTION WITH SERVER

REFERENCE TO RELATED APPLICATIONS

This application claims priority from Japanese Patent Application No. 2023-028984 filed on Feb. 27, 2023. The entire content of the priority application is incorporated herein by reference.

BACKGROUND ART

Conventionally, a server and devices that communicate with the server have been used. For example, a system has been proposed that includes a printing mediation server and a plurality of printers. The printers include a first type of printer that performs status notification communications, and a second type of printer that does not perform status notification communications. When the first type of printer receives a print notification from the printing mediation server, the first type of printer sends a display notification to each of the second type of printers. At this time, a predetermined character string is displayed on each printer, and the user can select a desired printer to execute the print.

SUMMARY

However, there is room for improvement in how the conventional technology handles devices that have not completed a connection with the server.

In view of the foregoing, it is an object of the present disclosure to provide a technology for handling devices that have not completed a connection with a server.

In order to attain the above and other objects, according to one aspect, the present disclosure provides a system including a plurality of devices and a sever. Each of the plurality of devices is connected to a network. The plurality of devices includes a first device and a second device. The server includes a storage device. The server is configured to communicate over the network. The second device is configured to perform confirming, in a state where the second device has completed a connection with the server, whether each of one or more devices of the plurality of devices other than the second device has completed a connection with the server. The one or more devices includes the first device. The second device is configured to further perform transmitting, when the first device is in a specific state in which the first device has not completed a connection with the server, first device identification information and first status information to the server. The first device identification information is identification information for identifying the first device. The first status information indicates a status of the first device. The server is configured to perform storing, in response to acquiring the first device identification information and the first status information which are transmitted from the second device in the transmitting, the acquired first device identification information and the acquired first status information in the storage device in association with administrator identification information associated with the second device. The administrator identification information associated with the second device is identification information for identifying an administrator associated with the second device.

According to another aspect, the present disclosure provides a device including a controller. The controller is configured to perform confirming, in a state where the device has completed a connection with a server configured to communicate over a network, whether each of one or more other devices connected to the network has completed a connection with the server. The one or more other devices includes a first device. The controller is configured to further perform transmitting, when the first device is in a specific state in which the first device has not completed a connection with the server, first device identification information and first status information to the server. The first device identification information is identification information for identifying the first device. The first status information indicates a status of the first device.

According to still another aspect, the present disclosure provides a method of managing a plurality of devices each connected to a network. The plurality of devices includes a first device and a second device. The method includes confirming, in a state where the second device has completed a connection with a server configured to communicate over the network, whether each of one or more devices of the plurality of devices other than the second device has completed a connection with the server. The one or more devices includes the first device. The method further includes transmitting, when the first device is in a specific state in which the first device has not completed a connection with the server, first device identification information and first status information from the second device to the server. The first device identification information is identification information for identifying the first device. The first status information indicates a status of the first device. The method further includes storing the transmitted first device identification information and the transmitted first status information in a storage device of the server in association with administrator identification information associated with the second device. The administrator identification information associated with the second device is identification information for identifying an administrator associated with the second device.

In the above configurations, the first device identification information and first status information of the first device that has not completed a connection with the server is transmitted to the server. This transmitted information can be used for handling the first device that has not completed a connection with the server.

The technology disclosed in this specification can be implemented in various forms, such as a method of transmitting information to a server; a device for transmitting information to a server; a method of storing information received from devices in a storage device; a server for storing information received from devices in a storage device; a method executed by a device and a server; a system including devices and a server; a computer program for implementing these methods or the functions of the devices, server, and system; and a computer-readable storage medium (e.g., a non-transitory computer-readable storage medium) that stores this computer program.

BRIEF DESCRIPTION OF DRAWINGS

FIG. 3 is a diagram illustrating an example of a printer database D3.

DESCRIPTION

A. First Embodiment

<A-1. System Configuration>

Figure 1:
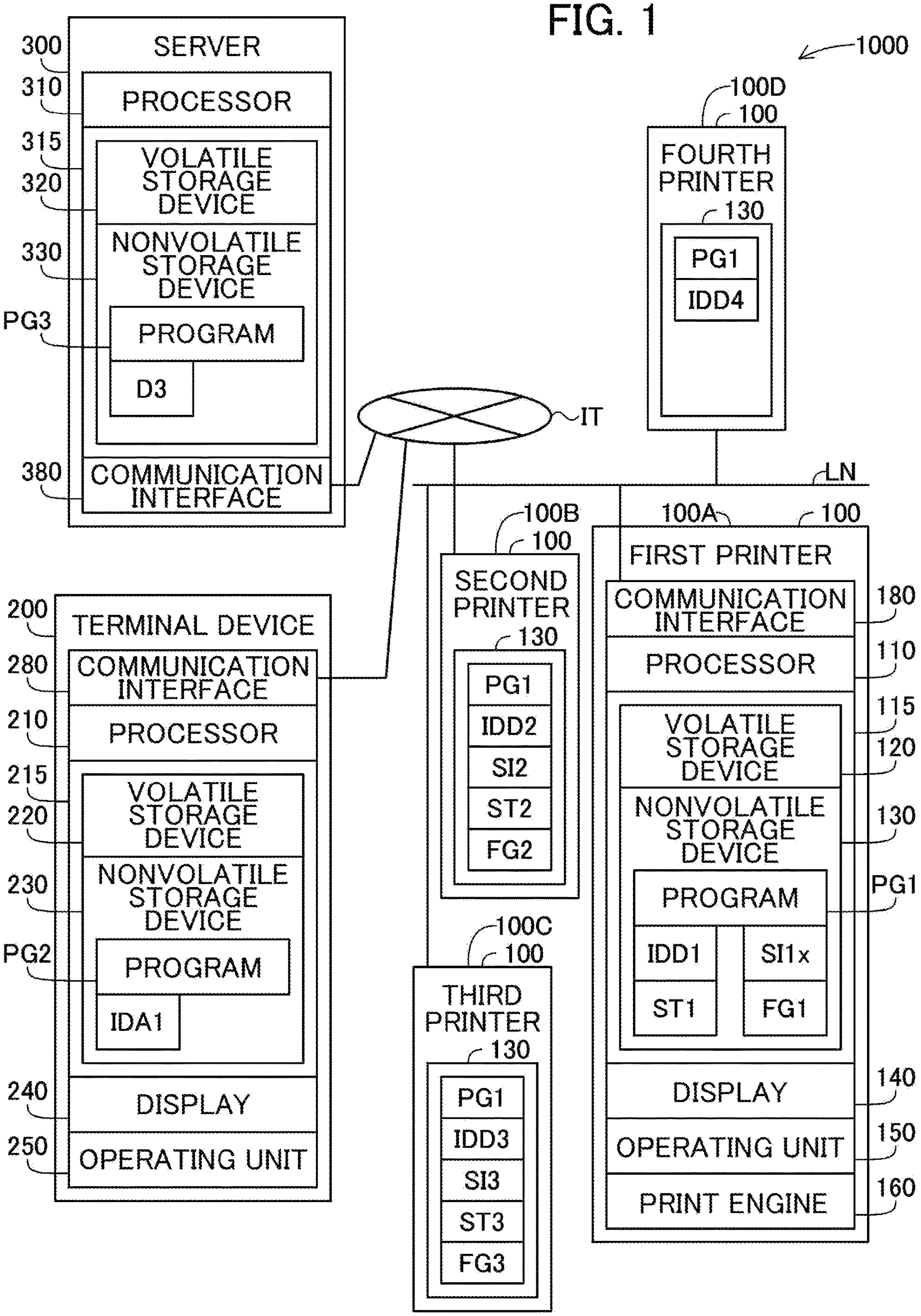
FIG. 1 is an explanatory view of a system according to one embodiment of the present disclosure.

FIG. 1 is a block diagram showing a system 1000 according to one embodiment of the present disclosure. The system 1000 includes a first printer 100A, a second printer 100B, a third printer 100C, a fourth printer 100D, a terminal device 200, and a server 300. The printers 100A-100D are connected to a local area network LN. The local area network LN is in turn connected to the Internet IT. The server 300 and terminal device 200 are connected to the Internet IT.

In the present embodiment, the server 300 provides services by communicating with the printers. These services may be any services related to printers. In the present embodiment, the server 300 counts the number of sheets (e.g., paper) printed by each printer. The sheet counts are used for various processes including printer maintenance and billing processes. The server 300 is operated by a service provider that provides the services.

The printers 100A-100D are used by members of the same user group, such as a home, business, or school. In this example, it will be assumed that the printers 100A-100C are subjects of the service (i.e., covered by the service), while the fourth printer 100D is not. Each of the printers 100A-100C is configured to be connected to the server 300 for the service to be applied. To ensure proper service is provided, a process is preferably performed to check, for each of the printers 100A-100C, whether the connection between the printer and the server 300 is complete. Such operations can place a significant burden on the user. As will be described later, once a printer has completed a connection with the server 300 in the present embodiment, the printer transmits information to the server 300 on other printers that have not completed connections with the server 300. By referencing this information obtained by the server 300, the administrator of the service provider can easily manage connection failures between the printers and the server 300.

In the present embodiment, the printers 100A-100D all have the same hardware configuration. In the following description, when it is not necessary to distinguish among the printers 100A-100D, the letter at the end of the reference numeral will be omitted and they will simply be referred to as printers 100.

Each printer 100 has a processor 110, a storage device 115, a display 140, an operating unit 150, a print engine 160, and a communication interface 180. These components are all interconnected via a bus (not shown).

The display 140 is a device configured to display images, such as a liquid crystal display (LCD) or an organic light-emitting diode (OLED) display. The operating unit 150 is a device configured to receive operations from the user and may include buttons, levers, and a touchscreen superposed over the display 140. The communication interface 180 is an interface for communicating with other devices. For example, the communication interface 180 may include one or more types of interfaces from among a wired LAN interface and a wireless LAN interface conforming to the IEEE 802.11 standard. The communication interface 180 of the printer 100 is connected to the local area network LN.

The print engine 160 is a device configured to print images. In the present embodiment, the print engine 160 is an inkjet printer. The print engine 160 is configured to print images using one or more types of colorants (e.g., ink in the four colors cyan, magenta, yellow, and black). The print engine 160 may be a device configured to print images according to another method (e.g., a laser printer).

The processor 110 is a device configured to perform data processing, such as a central processing unit (CPU) or a system on a chip (SoC). The storage device 115 includes a volatile storage device 120, and a nonvolatile storage device 130. The volatile storage device 120 is DRAM, for example. The nonvolatile storage device 130 is flash memory, for example.

The nonvolatile storage device 130 of each printer 100 stores therein a program PG1 and device identification information IDD unique to the printer 100. Specifically, first device identification information IDD1, second device identification information IDD2, third device identification information IDD3, and fourth device identification information IDD4 are stored in the nonvolatile storage devices 130 of the printers 100A, 100B, 100C, and 100D as the device identification information IDD, respectively. The device identification information IDD is identification information for identifying the printer 100. Hereinafter, the first device identification information IDD1, the second device identification information IDD2, the third device identification information IDD3, and the fourth device identification information IDD4 will be sometimes referred to simply as the "device identification information IDD1," "device identification information IDD2," "device identification information IDD3," and "device identification information IDD4," respectively. The program PG1 is common to all the printers 100A-100D. Processes that the processor 110 executes according to the program PG1 include a process for controlling the print engine 160 to print images, a process for communicating with other printers 100, and a process for communicating with the server 300. Data for the program PG1 and the device identification information IDD is stored in the nonvolatile storage device 130 when the printer 100 is manufactured. The program PG1 may also be stored in the nonvolatile storage device 130 of the printer 100 by being downloaded from a server (not shown) over the network or by being copied from a portable storage device connected to the printer 100 (e.g., a USB flash drive; not shown).

The nonvolatile storage devices 130 in the printers 100A-100C, which are covered under the service, also store therein data for first service information SI1*x*, second service information SI2, and third service information SI3 as service information SI; first attempt flag FG1, second attempt flag FG2, and third attempt flag FG3 as an attempt flag FG; and first status information ST1, second status information ST2, and third status information ST3 as status information, respectively. Hereinafter, the first service information SI1*x*, second service information SI2, and third service information SI3 will be sometimes referred to simply as the "service information SI1*x*," "service information SI2," and "service information SI3," respectively; the first attempt flag FG1, second attempt flag FG2, and third attempt flag FG3 will be sometimes referred to simply as the "attempt flag FG1," "attempt flag FG2," and "attempt flag FG3," respectively; and the first status information ST1, second status information tion ST2, and third status information ST3 will be sometimes referred to simply as "status information ST1," "status information ST2," and "status information ST3," respectively.

The service information SI1*x*, SI2, and SI3 is used for communicating with the server 300 for the service. In the present embodiment, the service information SI includes service identification information, which is identification information used for identifying each individual printer in providing the service. The service information SI1*x*, SI2, and SI3 is set during an initialization process for establishing the service. The initialization process is performed by the user in accordance with instructions given by the service provider. Alternatively, the service provider may perform the initialization process and may provide the user with the printers 100A-100C that have already been initialized.

The attempt flags FG1, FG2, and FG3 indicate whether an attempt has been made to connect the printers 100A, 100B, and 100C to the server 300, respectively. The attempt flags FG1, FG2, and FG3 are set to "not yet attempted" in the initialization process described above.

The status information ST1, ST2, and ST3 indicates the connection status between the printer 100A and the server 300, the connection status between the printer 100B and the server 300, and the connection status between the printer 100C and the server 300, respectively. Specifically, the status information ST1, ST2, and ST3 specifies either "complete" or "incomplete". The status information ST1, ST2, and ST3 is set to "incomplete" in the initialization process described above.

The attempt flags FG1, FG2, and FG3 and status information ST1, ST2, and ST3 are updated through a connection process for connecting the corresponding printers 100 to the server 300 (described later).

The terminal device 200 is a terminal device used by the administrator of the service provider and may be a personal computer, tablet computer, or smartphone, for example. The administrator uses the terminal device 200 to reference information that the server 300 obtains from printers 100. The terminal device 200 includes a processor 210, a storage device 215, a display 240, an operating unit 250, and a communication interface 280. All of these components are interconnected via a bus (not shown).

The display 240 is a device configured to display images, such as an LCD or an OLED display. The operating unit 250 is a device configured to receive operations from the user and may include buttons, levers, and a touchscreen superposed over the display 240. The communication interface 280 is an interface for communicating with other devices. For example, the communication interface 280 may include one or more types of interfaces from among a wired LAN interface, a wireless LAN interface conforming to the IEEE 802.11 standard, and a cellular network interface (a mobile phone network interface), for example. In the present embodiment, the communication interface 280 is connected to the Internet IT via a network (not shown), such as a local area network or a cellular network.

The processor 210 is a device configured to perform data processing, such as a CPU or a SoC. The storage device 215 includes a volatile storage device 220, and a nonvolatile storage device 230. The volatile storage device 220 is DRAM, for example. The nonvolatile storage device 230 is flash memory, for example.

The nonvolatile storage device 230 stores therein data for a program PG2 and first administrator identification information IDA1 as administrator identification information IDA. The administrator identification information IDA is identification information for identifying the administrator that uses the terminal device 200. The administrator identification information IDA is predetermined. The program PG2 is a management application program that implements the process of obtaining printer-related information from the server 300. The program PG2 is provided by the service provider. The program PG2 may be stored in the nonvolatile storage device 230 of the terminal device 200 by being downloaded from a server (not shown) over the network or by being copied from a portable storage device connected to the terminal device 200 (e.g., a USB flash drive; not shown).

The server 300 has a processor 310, a storage device 315, and a communication interface 380. These components are interconnected via a bus (not shown). The communication interface 380 is an interface for communicating with other devices. For example, the communication interface 380 includes one or more interfaces from among a wired LAN interface, and a wireless LAN interface conforming to the IEEE 802.11 standard. In the present embodiment, the communication interface 380 is connected to the Internet IT via a network (not shown), such as a local area network. The processor 310 is a device configured to perform data processing, such as a CPU or an SoC. The storage device 315 includes a volatile storage device 320, and a nonvolatile storage device 330. The volatile storage device 320 is DRAM, for example. The nonvolatile storage device 330 is flash memory, for example.

The nonvolatile storage device 330 stores therein data for a program PG3 and a printer database D3. By executing the program PG3, the processor 310 can implement various processes for providing services (described later in greater detail). The program PG3 is uploaded to the server 300 by the service provider. The printer database D3 will be described later in greater detail.

<A2. Connection Process>

Figure 2:
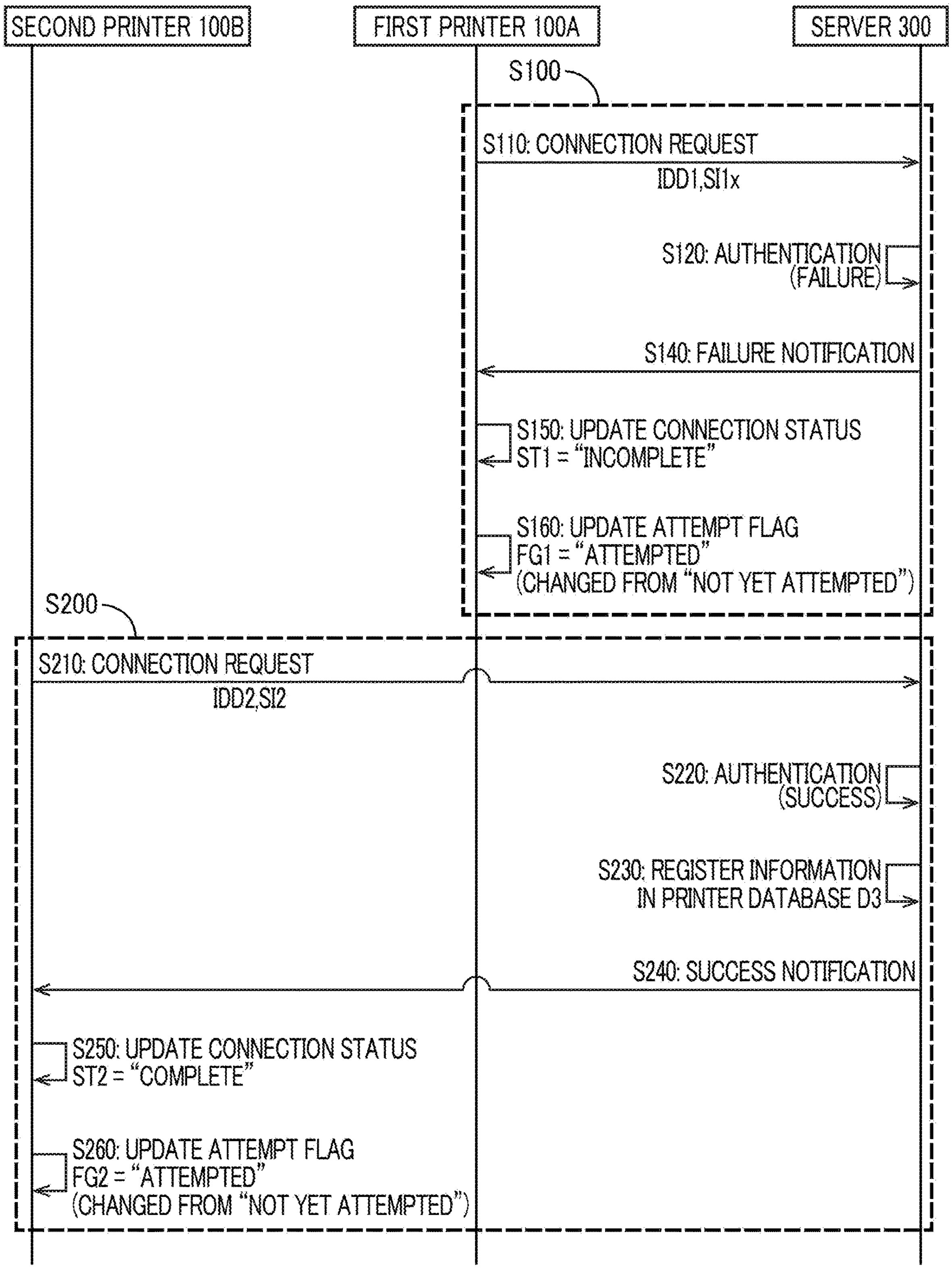
FIG. 2 is a sequence diagram illustrating an example of a connection process.

FIG. 2 is a sequence diagram showing an example of a connection process. In the connection process, the printer 100 attempts to connect to the server 300. The diagram shows various steps performed on the first printer 100A, second printer 100B, and server 300. The steps are executed by the processors 110, 110, and 310 of the respective first printer 100A, second printer 100B, and server 300. Below, the act of the processors 110, 110, and 310 of the corresponding first printer 100A, second printer 100B, and server 300 executing a process will also be described as the first printer 100A, second printer 100B, and server 300 executing the process.

In the present embodiment, the processor 110 of each printer 100 treats the powering on of the printer 100 as an instruction to connect to the server 300. Thus, in response to the power to the printer 100 being turned on, the processor 110 of the printer 100 attempts to connect to the server 300. Data for information specifying the location of the server 300 on the network (e.g., a uniform resource locator (URL)) is stored in the nonvolatile storage device 130 of each printer 100 in advance (not shown). Note that if no data for the service information SI (e.g., the service information SI1*x*, SI2, and SI3) is stored in the nonvolatile storage device 130, the processor 110 need not attempt to connect to the server 300 and may cancel the connection attempt.

FIG. 2 shows a first connection process S100 (including S110-S160) for the first printer 100A, and a second connection process S200 (including S210-S260) for the second printer 100B. First, the first connection process S100 for the first printer 100A will be described.

When the power to the first printer 100A is turned on, in S110 the first printer 100A transmits a connection request to the server 300. This request includes data for the first device identification information IDD1 and first service information SI1*x* of the first printer 100A. In S120 the server 300 performs authentication by referencing the printer database D3.

FIG. 3 shows an example of the printer database D3. The printer database D3 shows correlations between the device identification information IDD, the service information SI, connection status ST, registering device RID, and the administrator identification information IDA. Thus, the printer database D3 has five fields for these five pieces of information, namely a field for the device identification information IDD, a field for the service information SI, a field for the connection status ST, a field for the registering device RID, and a field for the administrator identification information IDA. The device identification information IDD is the identification information of the printer 100. The service information SI is the service information assigned to the printer 100. The service information SI includes the service identification information in the present embodiment. The connection status ST indicates the state of connection with the server 300. The connection status ST can indicate either "complete" or "incomplete". The registering device RID is the device identification information IDD of the printer 100 that has registered the connection status ST. As will be described later, the printer 100 may register its own connection status ST, or the connection status ST can be registered by another printer 100. The administrator identification information IDA is the identification information of the administrator assigned to the printer 100. It will be assumed that the same administrator is assigned to printers 100 belonging to the same user group (e.g., the printers 100A-100C).

The first three rows R1, R2, and R3 (i.e., the first three records) in the printer database D3 show information registered during the initialization process for the printers 100A, 100B, and 100C, respectively. As shown in FIG. 3, a correspondence between the service information SI and administrator identification information IDA is registered in the initialization process, while the other information IDD, ST, and RID are not set at this time. Note that the information IDD, ST, and RID registered in subsequent processes are depicted in FIG. 3. In this example, it will be assumed that service information SI1 is assigned to the first printer 100A but the service information SI1*x* different from the service information SI1 has been mistakenly stored in the nonvolatile storage device 130 of the first printer 100A. The last line RL in FIG. 3 shows information (i.e., a record) that will be registered in S390 described later (see FIG. 4). Thus, the information of the last line RL is not registered immediately after the initialization process for the printers 100A, 100B, and 100C.

In S120 of FIG. 2, the server 300 determines that authentication is successful when the service information SI1*x* acquired from the first printer 100A is already registered in the printer database D3. In the present embodiment, the incorrect service information SI1*x* is not registered in the printer database D3. Thus, the server 300 determines that authentication has failed.

In S140 the server 300 notifies the first printer 100A of the authentication result (a failure in this case). When the authentication result is a failure, in S150 the first printer 100A sets the first status information ST1 to "incomplete" and in S160 changes the attempt flag FG1 from "not yet attempted" to "attempted". Subsequently, the first printer 100A ends the connection process.

Next, the second connection process S200 for the second printer 100B will be described. In response to the power to the second printer 100B being turned on, in S210 the second printer 100B transmits a connection request to the server 300. The connection request sent in S210 is similar to the connection request sent in S110. This connection request includes data for the second device identification information IDD2 and service information SI2 of the second printer 100B. In S220 the server 300 performs authentication by referencing the printer database D3 (see FIG. 3). Since the service information SI2 received from the second printer 100B is registered in the printer database D3 (see the second row R2), the server 300 determines in S220 that authentication is successful.

When authentication is successful, in S230 the server 300 registers information of the second printer 100B in the printer database D3 in association with the service information SI2. The second row R2 in FIG. 3, in which the service information SI2 is registered, shows an example of the information registered in S230. That is, the device identification information IDD is set to the device identification information IDD2 of the second printer 100B, the connection status ST is set to "complete", and the registering device RID is set to the device identification information IDD2 of the second printer 100B.

In S240 of FIG. 2, the server 300 notifies the second printer 100B of the authentication result (a success in this case). When the authentication result is a success, in S250 the second printer 100B sets the second status information ST2 to "complete" and in S260 changes the attempt flag FG2 from "not yet attempted" to "attempted". Subsequently, the second printer 100B ends the connection process.

In the example of the first embodiment described above, the first printer 100A cannot complete a connection with the server 300, while the second printer 100B completes a connection with the server 300. Thus, the first printer 100A cannot perform communications with the server 300 for the service, while the second printer 100B can perform communications with the server 300 for the service. In other words, a connection for the service cannot be established between the first printer 100A and the server 300, while a connection for the service is established between the second printer 100B and the server 300. In the present embodiment, the state in which the printer 100 has completed a connection with the server 300 denotes the state in which the printer 100 can perform service-related communications with the server 300, while the state in which the printer 100 has not completed a connection with the server 300 denotes the state in which the printer 100 cannot perform service-related communications with the server 300. For example, the state in which the printer 100 has completed a connection with the server 300 may denote the state in which the printer 100 can perform necessary communications with the server 300 for receiving the service from the server 300, while the state in which the printer 100 has not completed a connection with the server 300 may denote the state in which the printer 100 cannot perform necessary communications with the server 300 for receiving the service from the server 300. Further, the state in which the printer 100 has completed a connection with the server 300 may denote the state in which the authentication required for receiving the service from the server 300 has been successful for the printer 100, while the state in which the printer 100 has not completed a connection with the server 300 may denote the state in which the authentication required for receiving the service from the server 300 has not been successful for the printer 100, for example. In this embodiment, each printer 100 that completes a connection with the server 300 notifies the server 300 of the number of sheets printed each time a print is executed (not shown in the drawings).

<A3. Collection-Provision-Updating Process>

Figure 4:
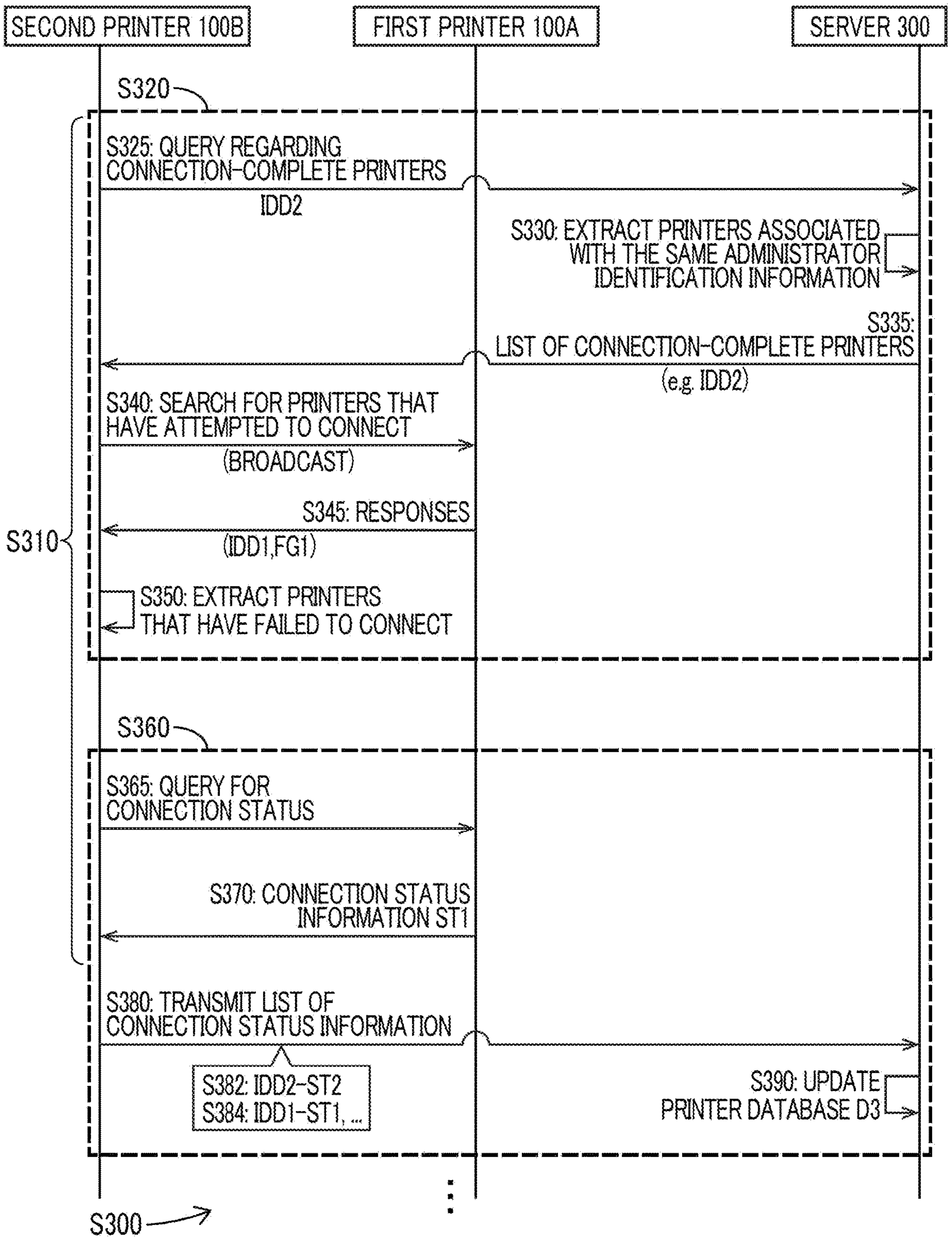
FIG. 4 is a sequence diagram illustrating an example of a collection-provision-updating process.

FIG. 4 is a sequence diagram showing an example of a collection-provision-updating process S300. In this collection-provision-updating process S300, a printer that has completed a connection with the server 300 (hereinafter called a "connection-complete printer") collects the connection statuses of other printers and provides the collected information to the server 300. The server 300 then uses the information provided by the connection-complete printer to update the printer database D3. The diagram shows various steps performed on the first printer 100A, second printer 100B, and server 300. The steps are executed by the processors 110, 110, and 310, respectively. However, as in the description of FIG. 2, the act of the processors 110, 110, and 310 executing a process will also be described as the first printer 100A, second printer 100B, and server 300 executing the process. In the following description, it will be assumed that the process in FIG. 4 is performed after the connection processes S100 and S200 of FIG. 2.

In response to a connection with the server 300 being completed (S240 of FIG. 2), the second printer 100B begins the collection-provision-updating process S300. In S325 the second printer 100B transmits a query to the server 300 regarding connection-complete printers. This query includes data specifying the device identification information IDD2 of the second printer 100B.

In S330 the server 300 references the printer database D3 (see FIG. 3) to identify the administrator identification information IDA (the first administrator identification information IDA1 in this case) associated with the device identification information IDD included in the query (the second device identification information IDD2 in this case). The server 300 extracts a list of device identification information IDD associated with the identified first administrator identification information IDA1 and having the connection status ST that specifies "complete".

The example of FIG. 3 assumes that three instances of service information SI1, SI2, and SI3 (i.e., three devices) are associated with the first administrator identification information IDA1. The device identification information IDD of the device whose connection status ST is set to "complete" among the three devices in this example is the second device identification information IDD2. Accordingly, in S330 of FIG. 4, the server 300 extracts a list consisting of the second device identification information IDD2.

In S335 of FIG. 4, the server 300 transmits data for the list of extracted device identification information IDD to the second printer 100B. The second printer 100B acquires data for the list of device identification information IDD and stores this data in the storage device 115 (e.g., the nonvolatile storage device 130).

In S340 the second printer 100B searches the network to which the second printer 100B is connected for printers 100 that have attempted to connect to the server 300. The second printer 100B may use any method to search for printers 100. In this embodiment, the second printer 100B transmits a request to the broadcast address of the network. Requests sent to the broadcast address are received by all devices on the local area network to which the second printer 100B is connected (the local area network LN in this case). The request sent in this embodiment is a request for the printer's device identification information IDD and attempt flag FG. For example, the request used in this case may be a Simple Network Management Protocol (SNMP) request, such as a Get Request.

In response to this request from the second printer 100B, all printers 100 on the local area network LN transmit data specifying their own device identification information IDD and attempt flag FG to the second printer 100B. Thus, in S345 the first printer 100A, for example, transmits data specifying its own device identification information IDD1 and attempt flag FG1 (see FIG. 1) to the second printer 100B. The second printer 100B acquires data for this information IDD1 and FG1 and stores the acquired data in the storage device 115 (e.g., the nonvolatile storage device 130). As described in S160 of FIG. 2, the attempt flag FG1 indicates "attempted".

While not indicated in the diagram, it will be assumed that power to the third printer 100C is off at this time. The fourth printer 100D also transmits a response to the second printer 100B in response to the request from the second printer 100B. However, since the nonvolatile storage device 130 of the fourth printer 100D does not store data for an attempt flag FG, the fourth printer 100D transmits data specifying its own device identification information IDD4 and data indicating there is no attempt flag FG to the second printer 100B.

In S350 of FIG. 4, the second printer 100B extracts all printers 100 that have attempted to connect to the server 300 but have failed. Hereinafter, printers that have failed in an attempt to connect to the server 300 will be called "target printers". In this embodiment, the second printer 100B extracts printers whose attempt flag FG is "attempted" from the printers 100 that have returned a response to the request sent in S340. Hereinafter, the printers whose attempt flag FG is "attempted" will be sometimes called "attempted printers". Then, after excluding printers 100 that have completed a connection with the server 300 (i.e., printers 100 in the list of device identification information IDD received in S335) from the extracted attempted printers, the second printer 100B sets the remaining printers 100 as target printers. In this example, the first printer 100A is extracted in S350 of FIG. 4 as the target printer. Hereinafter, the first printer 100A will also be referred to as the target printer 100A.

The steps S325-S350 described above constitute a process S320 performed to identify target printers. Hereinafter, the process S320 will be referred to as the target identification process S320.

In S365 the second printer 100B transmits a connection status query (i.e., a request for information indicating the connection status) to each target printer. For example, an SNMP request such as a Get Request may be used as the query.

In response to the query from the second printer 100B, in S370 the first printer 100A transmits data specifying its own status information (the status information ST1 in this case) to the second printer 100B. The second printer 100B acquires data specifying the status information ST1 and stores this data in the storage device 115 (e.g., the nonvolatile storage device 130).

In S380 the second printer 100B transmits a list of status information to the server 300. S380 includes two steps S382 and S384. In S382 the second printer 100B transmits data specifying its own device identification information IDD2 and status information ST2 to the server 300. As described in S250 of FIG. 2, the second status information ST2 indicates "complete".

In S384 the second printer 100B transmits data specifying the target printers' device identification information IDD and status information to the server 300. In this example, the second printer 100B transmits data specifying the device identification information IDD1 and status information ST1 of the first printer 100A to the server 300 in S384. As described in S150 of FIG. 2, the status information ST1 indicates "incomplete". Note that step S384 is executed for each target printer when a plurality of target printers has been extracted through S350.

Here, target printers addressed in the process of S384 are printers 100 that are in a specific state in which a connection with the server 300 has not been completed. As described in S350, the specific state in the present embodiment is a state in which the printer 100 has failed in an attempt to connect to the server 300. Steps S325, S335, S340, S345, S350, S365, and S370 executed by the second printer 100B constitute a process S310. The second printer 100B performs the process S310 to confirm whether or not the states of other printers 100 are the specific state. Hereinafter, the process S310 will be sometimes referred to as the "first process S310".

In S390 the server 300 updates the printer database D3 based on the information acquired in S380. Here, the server 300 updates information on the source device of the transmission in S380 (the second printer 100B in this case) and information on the target printers. The server 300 stores the updated information (and hence the updated printer database D3) in the nonvolatile storage device 330.

Thus, in S390 the server 300 updates the connection status ST in the printer database D3 (the connection status ST in the second row R2 of FIG. 3 in this case) associated with the device identification information IDD of the transmission source device (the device identification information IDD2 of the second printer 100B in this case) to the status information ST2 acquired in S382. Normally, the connection status ST of the transmission source device prior to the update and the new connection status ST of the transmission source device both indicate "complete".

In S390, the server 300 also registers the device identification information IDD and connection status ST of each target printer in the printer database D3 in association with the first administrator identification information IDA1 associated with the device identification information IDD2 of the second printer 100B that is the transmission source device. The last line RL (i.e., the last record) shows an example of information registered in S390. In this example, the device identification information IDD1 and status information ST1 ("incomplete" in this case) of the first printer 100A are registered in association with the first administrator identification information IDA1. The registering device RID is set to the device identification information IDD2 of the transmission source device. Note that when a plurality of target printers has been extracted through S350, information for each target printer is registered in S390.

The second printer 100B repeatedly transmits the list of status information. In other words, the second printer 100B repeatedly performs S380, which includes steps S382 and S384. In S384 the second printer 100B preferably transmits the latest information on the first printer 100A. Hence, the second printer 100B executes S365 in coordination with the trigger for the execution of S380. In this embodiment, the second printer 100B executes S365 immediately prior to executing S380. This enables the second printer 100B to transmit the latest information in S384. In this way, steps S365-S390 constitute a provision-updating process S360, which is repeatedly executed. Various triggers can be employed as the trigger of the execution of the process of S380. For example, the second printer 100B may execute S380 periodically. Hence, the trigger for executing S380 may be the elapsing of a prescribed time since the last execution of S380.

After the information IDD1 and ST1 of the first printer 100A (information in the last line RL in this case) has been registered in the printer database D3, the information IDD1 and ST1 of the first printer 100A may be again transmitted to the server 300. In this case, the server 300 updates the information ST and RID associated with the registered first device identification information IDD1 using the newly acquired information.

<A4. Information Displaying Process>

Figure 5A:
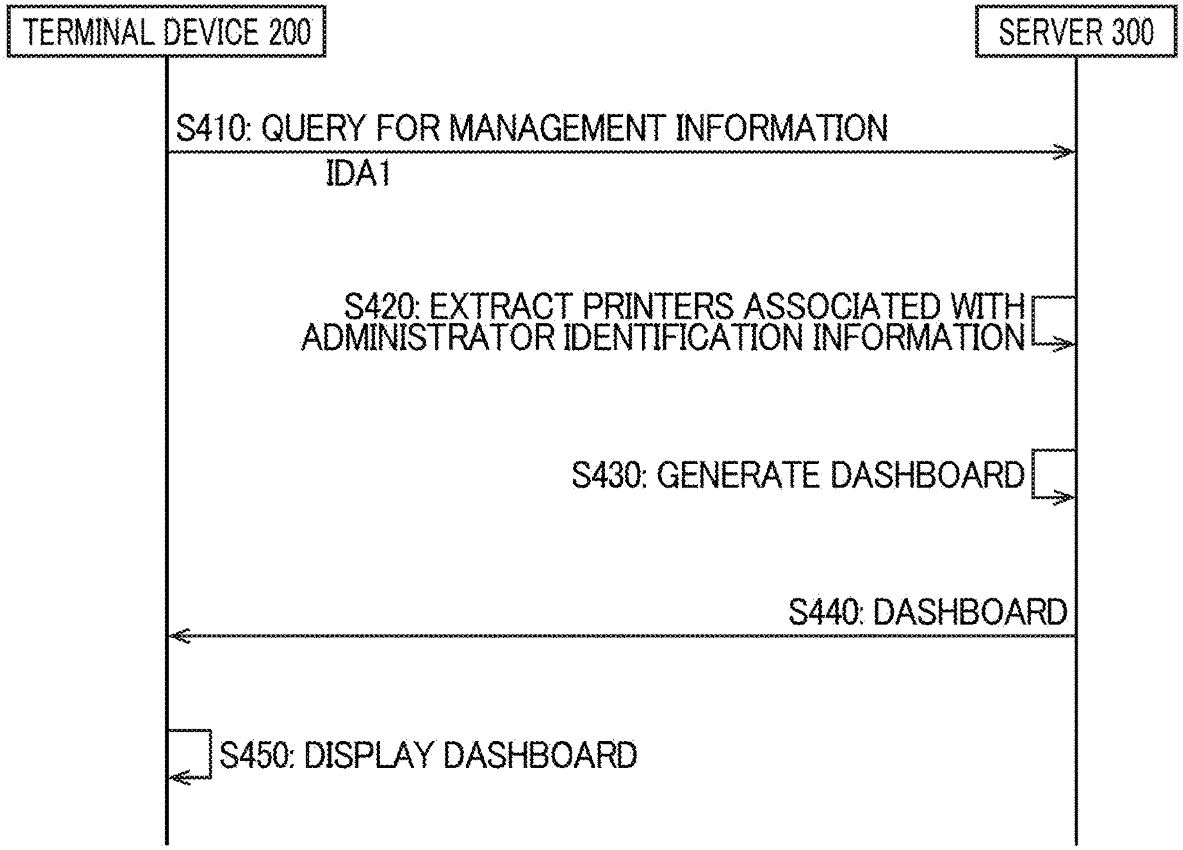
FIG. 5A is a sequence diagram illustrating an example of an information displaying process.

FIG. 5A is a sequence diagram showing an example of an information displaying process. In the information displaying process, the server 300 transmits information on printers associated with the administrator identification information IDA1 of the administrator to the terminal device 200 of that administrator. The terminal device 200 displays the acquired information on the display 240. By viewing the displayed information, the administrator can learn about connection problems between printers and the server 300. The diagram shows various steps performed on the terminal device 200 and server 300. The steps are executed by the processor 210 and processor 310, respectively, but the act of these processors executing a process will also be described as the terminal device 200 and server 300 executing the process. The following description assumes that the process of FIG. 5A is executed after the collection-provision-updating process S300 of FIG. 4.

In S410 the administrator performs operations on the operating unit 250 of the terminal device 200 to start up a management application and to input an instruction into the terminal device 200 for acquiring management information. In response to this acquisition instruction, the terminal device 200 transmits a query for management information to the server 300. This query includes data for the first administrator identification information IDA1.

In S420 the server 300 references the printer database D3 (see FIG. 3) to extract all device identification information IDD associated with the first administrator identification information IDA1. In this example, the server 300 extracts the device identification information IDD1 and IDD2 in S420 of FIG. 5A.

Figure 5B:
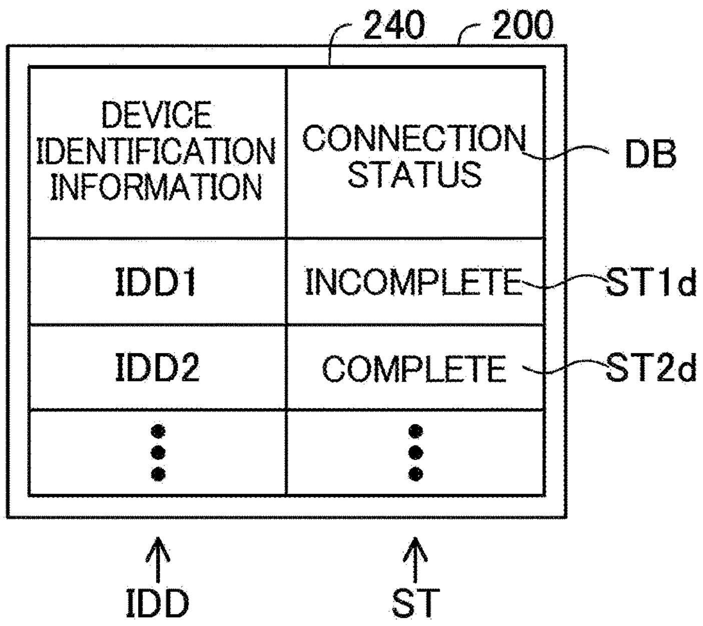
FIG. 5B is a diagram illustrating an example of a dashboard.

In S430 the server 300 generates data for a dashboard. FIG. 5B shows an example of the dashboard. A dashboard DB depicted in FIG. 5B shows correspondences between device identification information IDD and connection statuses ST. When the device identification information IDD1 and IDD2 are extracted in S420, the dashboard DB specifies a correlation between the first device identification information IDD1 and a first connection status ST1*d* ("incomplete" in this case), and a correlation between the second device identification information IDD2 and a second connection status ST2*d* ("complete" in this case).

The dashboard DB may be generated in any of various data formats including text formats such as Hyper Text Markup Language (HTML) and image data formats such as Portable Network Graphics (PNG). Alternatively, the server 300 may generate a web page representing the dashboard DB. In this case, data for the dashboard DB may be data representing a link to the web page (e.g., a URL).

In S440 of FIG. 5A, the server 300 transmits data for the dashboard DB to the terminal device 200. In S450 the terminal device 200 uses the data received from the server 300 to display the dashboard DB on the display 240 (see FIG. 5B). By viewing the dashboard DB, the administrator recognizes that the first printer 100A has not completed a connection with the server 300. Accordingly, the administrator may initiate an operation for connecting the first printer 100A to the server 300. For example, the administrator may go to the location of the first printer 100A to perform maintenance on the first printer 100A.

As described above, the system 1000 in the embodiment (see FIG. 1) includes the plurality of printers 100A-100D connected to the network (the local area network LN in this case) and the server 300 configured to communicate over the local area network LN. In this embodiment, the server 300 is configured to communicate with the plurality of printers 100A-100D via the local area network LN and the Internet IT. The plurality of printers 100A-100D includes the first printer 100A and the second printer 100B.

The following is a description of some of the processes executed by the second printer 100B. In a state where the second printer 100B has completed a connection with the server 300 (S200 of FIG. 2), the second printer 100B executes the first process S310 in FIG. 4. In the first process S310, the second printer 100B confirms whether each of one or more printers other than the second printer 100B (the first printer 100A in this example) has completed a connection with the server 300. In other words, the second printer 100B checks, for each of one or more printers 100 of the plurality of printers 100A-100D other than the second printer 100B, whether the printer 100 has completed a connection with the server 300. In S384 the second printer 100B transmits device identification information of target printers and status information indicating the status of each target printer to the server 300. Target printers addressed in the process of S384 are printers that are in the specific state, which is a state in which a connection with the server 300 has not been completed. The first printer 100A is an example of a target printer. In S390 the server 300 stores the first device identification information IDD1 and first status information ST1 of the first printer 100A received from the second printer 100B in the nonvolatile storage device 330 in association with the administrator identification information IDA1 of the administrator associated with the second printer 100B.

Thus, the information sent to the server 300 by the second printer 100B includes the first device identification information IDD1 and status information ST1 of the first printer 100A that is in the specific state, which is a state in which a connection with the server 300 has not been completed. This information IDD1 and ST1 can be used for properly handling the first printer 100A which has not completed a connection with the server 300. For example, the information IDD1 and ST1 can be used in various processes performed to connect the first printer 100A to the server 300 (e.g., processes for displaying the dashboard DB and for performing maintenance on the first printer 100A). The information IDD1 and ST1 are associated with the first administrator identification information IDA1, which is also associated with the second printer 100B. Hence, the information IDD1 and ST1 can be used in the management of printers performed by the same administrator managing the second printer 100B. Since the administrator is a staff member of the service provider, a member in the user group using the printers 100A-100D need not manage connections between printers 100 and the server 300. However, the administrator may be a member of the user group.

As described in FIG. 4, in response to completing a connection with the server 300 (S200 of FIG. 2), at a timing after the completion of the connection (S200) the second printer 100B begins the process in S310 to confirm the status of other printers 100. Accordingly, when a connection between the first printer 100A and server 300 is not completed at the time that the second printer 100B completes a connection with the server 300, the second printer 100B can transmit the information IDD1 and ST1 of the first printer 100A to the server 300.

Further, in S384 of FIG. 4, the second printer 100B transmits device identification information and status information of each target printer that is in the specific state, which is a state in which a connection with the server 300 has not been completed. As described in S350, a target printer is a printer that has attempted to connect to the server 300 but has failed to connect to the server 300. In other words, the specific state is the state of having failed in an attempt to connect to the server 300. Therefore, the second printer 100B can avoid transmitting information to the server 300 about the fourth printer 100D, which does not need to connect to the server 300.

Further, there may be a problem with the first printer 100A (e.g., an error in the service information SI1 or the like) when the first printer 100A is in the above-described specific state. In S384 of FIG. 4, the second printer 100B transmits the device identification information IDD1 and status information ST1 of the first printer 100A that is in the specific state (i.e., the first printer 100A that has a potential problem) to the server 300. This information IDD1 and ST1 can be used in various processes (e.g., a maintenance process for the first printer 100A) performed to connect the first printer 100A to the server 300 when the first printer 100A has a potential problem.

In S370 of FIG. 4, the first printer 100A transmits the status information ST1 indicating a first connection state to another printer (the second printer 100B in this case). The first connection state denotes the connection state between the first printer 100A and the server 300. In S384 the second printer 100B transmits first status information (equivalent to the status information ST1 in this embodiment) to the server 300. This first status information indicates the first connection state indicated by the status information ST1 received from the first printer 100A. In this way, the second printer 100B notifies the server 300 of the connection state indicated by the status information ST1 acquired from the first printer 100A. This process reduces the possibility of the second printer 100B transmitting erroneous information related to the first printer 100A.

In S382 of FIG. 4, the second printer 100B transmits the second status information ST2 indicating a second connection state to the server 300. The second connection state denotes the connection state between the second printer 100B and the server 300. The second printer 100B performs the process of S365 (i.e., requests the first printer 100A to transmit the status information ST1 of the first printer 100A) in coordination with the process of S380, which includes S382. Therefore, the second printer 100B can transmit both its own status information ST2 and information indicating the latest status information ST1 of the first printer 100A to the server 300.

In S440 of FIG. 5A, the server 300 also outputs display information for displaying the dashboard DB. As shown in FIG. 5B, the dashboard DB includes the first connection status ST1*d* of the first device identification information IDD1 (i.e., the first printer 100A), and the second connection status ST2*d* of the second device identification information IDD2 (i.e., the second printer 100B). The dashboard DB is an example of management information that includes the first connection state of the first printer 100A that has not completed a connection with the server 300, and the second connection state of the second printer 100B that has completed a connection with the server 300. By viewing the dashboard DB, the administrator can recognize not only that the second printer 100B has completed connecting to the server 300 but also that the first printer 100A has not completed connecting to the server 300. The administrator can then appropriately manage the first printer 100A that has not completed a connection to the server 300. For example, the administrator may perform maintenance on the first printer 100A.

B. Second Embodiment

Figure 6:
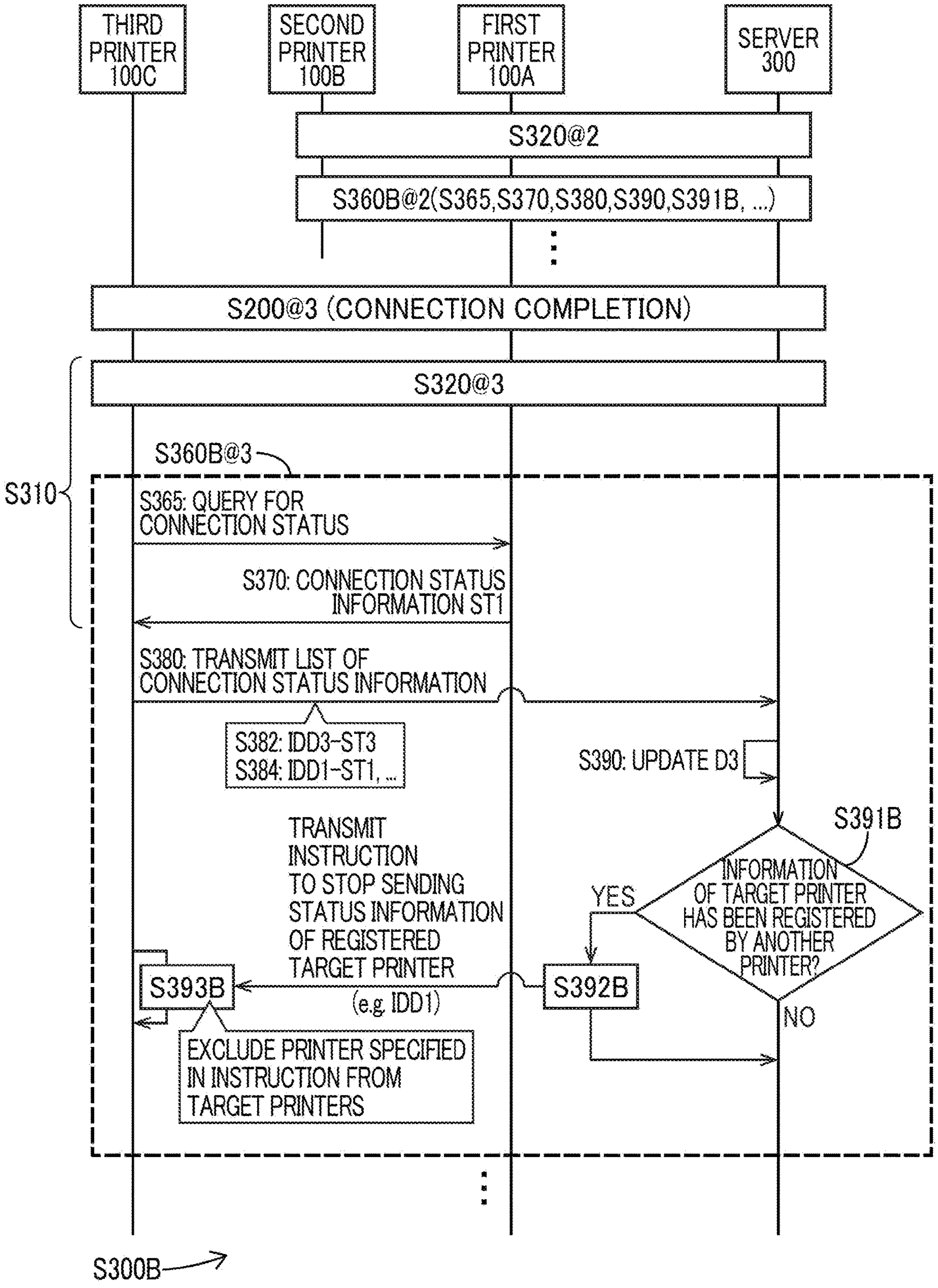
FIG. 6 is a sequence diagram illustrating another example of the collection-provision-updating process.

FIG. 6 is a sequence diagram showing a collection-provision-updating process S300B according to a second embodiment of the present disclosure. This process differs from the collection-provision-updating process S300 in FIG. 4 in the following way. When the first printer 100A is in the specific state and the server 300 receives the status information ST1 of the first printer 100A from a plurality of printers 100, in S300B of the present embodiment the server 300 transmits, to printers 100 whose device identification information IDD is not the device identification information IDD registered as the registering device RID of the first printer 100A that is in the specific state, an instruction instructing those printers 100 to stop transmitting the status information ST1. The remaining parts of the collection-provision-updating process S300B are identical to corresponding parts in the collection-provision-updating process S300 of FIG. 4 and, hence, a description of these parts has been omitted.

FIG. 6 shows the third printer 100C in addition to the first printer 100A, second printer 100B, and server 300. The various steps shown in the diagram for the first printer 100A, second printer 100B, third printer 100C, and server 300 are executed by the corresponding processors 110, 110, 110, and 310. The act of these processors executing a process will also be described as the corresponding first printer 100A, second printer 100B, third printer 100C, and server 300 executing the process. In the following description, it will be assumed that the process in FIG. 6 is performed after the connection processes S100 and S200 of FIG. 2.

The process of S320@2 is identical to the process of S320 in FIG. 4. The process of S360B@2 is equivalent to the process of S360 in FIG. 4 with the changes described below. As will be described later, the initial S360B@2 following S320@2 is identical to S360 in FIG. 4.

The number following the "@" of the step number for a process denotes the number of the printer 100 initiating the process. For example, the second printer 100B initiates both S320@2 and S360B@2. If the portion of the step number before the "@" is identical between two processes, the steps of the two processes are identical. For example, the process of S360B@2 has identical steps to the process of S360B@3. In the following description, the step number of a process is referred to by the portion of the step number prior to the "@" when not distinguishing among printers initiating the process. This applies to other step numbers described below.

Following S320@2 and S360B@2, a connection process S200@3 is performed between the third printer 100C and the server 300. Steps in the connection process S200@3 are identical to those in the second connection process S200 of FIG. 2. In this example, the third printer 100C completes a connection with the server 300 through the connection process S200@3.

The third row R3 in the printer database D3 (see FIG. 3) shows an example of information registered in S200@3. The third row R3 is information (i.e., a record) associated with the service information SI3 of the third printer 100C. The device identification information IDD is set to the third device identification information IDD3 of the third printer 100C, the connection status ST is set to "complete", and the registering device RID is set to the third device identification information IDD3 of the third printer 100C.

Following the connection process of S200@3, the third printer 100C initiates the target identification process S320@3. Steps in the target identification process S320@3 are identical to those in the target identification process S320 of FIG. 4. However, in this process the third printer 100C, rather than the second printer 100B, identifies the target printer 100A. After S320@3 in FIG. 6, the third printer 100C initiates a provision-updating process S360B@3. Steps in the provision-updating process S360B@3 differ from those in the provision-updating process S360 of FIG. 4 only in that steps S391B, S392B, and S393B have been added after S390. Steps S365, S370, S380, and S390 in the provision-updating process S360B@3 are identical to the corresponding steps S365, S370, S380, and S390 in FIG. 4. In S365 the third printer 100C transmits a connection status query to the target printer 100A, and in S370 acquires data for the status information ST1 from the first printer 100A. In S382 of S380, the third printer 100C transmits data on its own device identification information IDD3 and status information ST3 to the server 300. In S384 the third printer 100C transmits data for the device identification information IDD1 and status information ST1 of the target printer 100A to the server 300. In S390 the server 300 updates the printer database D3 (see FIG. 3) using the information acquired in S380.

In this case, the first device identification information IDD1 of the first printer 100A acquired from the third printer 100C has already been registered by the second printer 100B indicated by the registering device RID, as shown in the last line RL of FIG. 3. When the server 300 determines in S391 that information on the target printer has already been registered by a printer different from the third printer 100C that is the transmission source device in S380 (S391B: YES), in S392B the server 300 transmits an instruction to the third printer 100C instructing the third printer 100C to stop transmitting status information on the target printer. This instruction includes data on the device identification information IDD (the first device identification information IDD1 in this case) of the target printer for which the transmission of status information is to be stopped.

In S393B the third printer 100C excludes the printer specified in the instruction received from the server 300 (the first printer 100A specified by the first device identification information IDD1 in this case) from the target printers.

On the other hand, when the server 300 determines that information on the target printer has not yet been registered by another printer (S391B: NO), the server 300 skips S392B. In this case, the third printer 100C does not execute step S393B.

Note that the determination in S391B, and by extension steps S392B and S393B, is performed for each target printer.

Thereafter, the third printer 100C repeatedly executes S365 and S380, as described above for the second printer 100B. Steps in S360B@2 performed by the second printer 100B as shown at the top of FIG. 6 are identical to those in S360B@3 performed by the third printer 100C. In the initial S360B@2 following S320@2, a NO determination is made in S391B for the first printer 100A. Hence, the initial S360B@2 is the same as S360 in FIG. 4.

In the second embodiment described above, the plurality of printers 100A-100D connected to the network (the local area network LN in this case) includes the third printer 100C, as illustrated in FIG. 1. Further, the server 300 executes the following process. In S360B@2 (and specifically in S380), the server 300 acquires from the second printer 100B the status information (the first status information ST1 in this case) specifying the status of the first printer 100A. After acquiring the first status information ST1 from the second printer 100B, in S360B@3 (and specifically in S380) the server 300 acquires from the third printer 100C the status information (the same status information ST1 in this case) specifying the status of the first printer 100A. Thus, the server 300 acquires the status information of the first printer 100A from the third printer 100C after acquiring the status information of the first printer 100A from the second printer 100B. In this case (S391B: YES), in S392B the server 300 transmits an instruction to the third printer 100C instructing the third printer 100C to stop transmitting the status information of the first printer 100A. In this way, the server 300 can stop the third printer 100C from transmitting duplicate information, thereby reducing the communication load between the first printer 100A and the third printer 100C and between the third printer 100C and the server 300. This action can also reduce processing load on the first printer 100A, third printer 100C, and server 300.

C. Third Embodiment

Figure 7:
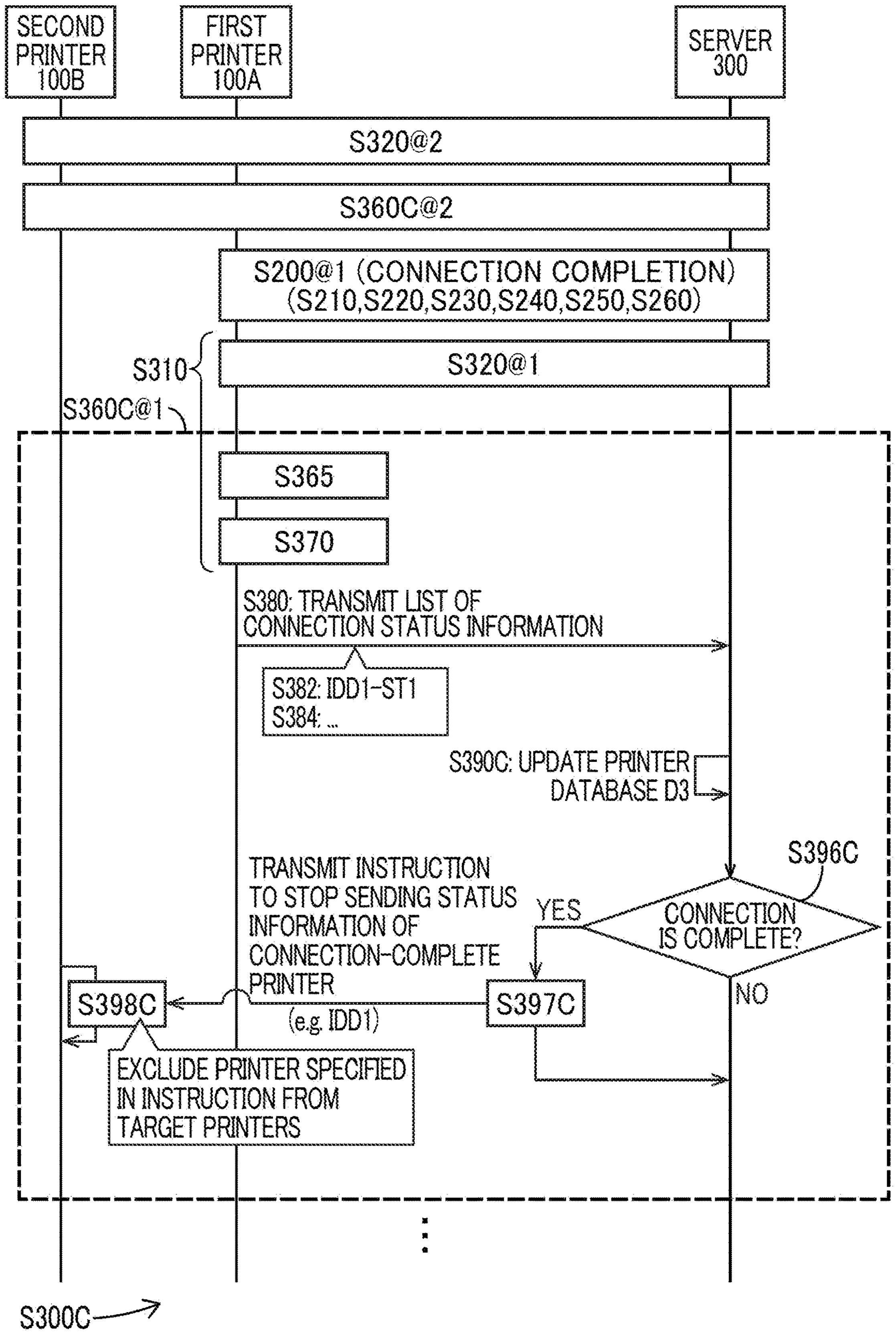
FIG. 7 is a sequence diagram illustrating another example of the collection-provision-updating process.

FIG. 7 is a sequence diagram showing a collection-provision-updating process S300C according to a third embodiment of the present disclosure. The collection-provision-updating process S300C differs from the collection-provision-updating process S300 in FIG. 4 as follows. In the collection-provision-updating process S300C of the present embodiment, when the server 300 receives from a printer associated with a connection status ST of "incomplete" (see FIG. 3) the printer's own status information indicating "complete", the server 300 transmits an instruction to a printer indicated as the registering device RID associated with the former printer, instructing the latter printer to stop transmitting the status information of the former printer. The remaining parts of the collection-provision-updating process S300C are identical to corresponding parts in the collection-provision-updating process S300 of FIG. 4 and, hence, a description of these parts has been omitted.

FIG. 7 shows the first printer 100A, second printer 100B, and server 300. The various steps shown in the diagram for the first printer 100A, second printer 100B, and server 300 are executed by the corresponding processors 110, 110, and 310. The act of these processors executing a process will also be described as the corresponding first printer 100A, second printer 100B, and server 300 executing the process. The following description will assume that the administrator changes the incorrect service information SI1*x* of the first printer 100A to the correct service information SI1 following the connection processes S100 and S200 in FIG. 2, and subsequently the process of FIG. 7 is performed.

S320@2 is identical to S320 in FIG. 4. The subsequent process of S360C@2 is equivalent to S360 in FIG. 4 with the changes described below. As will be described later, the initial S360C@2 following S320@2 is identical to S360 in FIG. 4.

Following S360C@2, a connection process S200@1 is performed between the first printer 100A and the server 300. Steps in the connection process S200@1 are identical to those in the second connection process S200 of FIG. 2. Here, the first printer 100A completes a connection with the server 300.

The first row R1 (i.e., the first record) in the printer database D3 (see FIG. 3) shows an example of information registered in S200@1 (and specifically in S230). The first row R1, which is associated with the service information SI1 of the first printer 100A, is updated in the same way the second row R2 is updated. The device identification information IDD is set to the device identification information IDD1 of the first printer 100A, the connection status ST is set to "complete", and the registering device RID is set to the device identification information IDD1 of the first printer 100A.

In S250 of S200@1 (see FIG. 7), the first printer 100A sets its own status information ST1 to "complete".

Following S200@1, the first printer 100A initiates a target identification process S320@1. Steps in S320@1 are identical to those in the target identification process S320 of FIG. 4. However, in this process the first printer 100A, rather than the second printer 100B, identifies the target printers. Note that in some cases a target printer (i.e., a printer that has not completed a connection with the server 300) may not be detected. The following description will assume that any target printers are not detected by the first printer 100A in S320@1.

Following S320@1, the first printer 100A initiates a provision-updating process S360C@1. The provision-updating process S360C@1 has two differences from the provision-updating process S360 in FIG. 4. The first difference is that S390 is replaced by S390C, and the second difference is that steps S396C, S397C, and S398C are added after S390C. Steps S365, S370, and S380 of S360C@1 are identical to the corresponding steps S365, S370, and S380 in FIG. 4. When a target printer is detected in S320@1, in S365 the first printer 100A transmits a connection status query to the target printer and in S370 acquires data for the status information from the target printer. When no target printer is detected in S320@1, the first printer 100A skips steps S365 and S370. S390C is similar to S390 in FIG. 4 with the addition of the process described below.

In S382 of S380, the first printer 100A transmits data for its own device identification information IDD1 and status information ST1 to the server 300. As described in S200@1, the status information ST1 indicates "complete". In S384 the first printer 100A transmits data for device identification information and status information on target printers to the server 300. When no target printer has been detected in S320@1, the first printer 100A skips S384.

In S390C, the server 300 updates the printer database D3 (see FIG. 3) using the information acquired in S380. S390C differs from S390 in FIG. 4 only in that the following process has been added. The server 300 searches the printer database D3 for information (a record) whose device identification information IDD is set to the device identification information IDD of the transmission source device in S380 (the device identification information IDD1 of the first printer 100A in this case), and whose connection status ST specifies "incomplete". Hereinafter, this information to be searched, i.e., this record to be searched will be called "non-updated information". In the example of FIG. 3, the server 300 retrieves information of the last line RL, i.e., the last record. The server 300 acquires the registering device RID of the non-updated information and subsequently deletes the non-updated information from the printer database D3.

In S396C the server 300 determines whether the connection status of the transmission source device in S380 has changed from "incomplete" to "complete". In the present embodiment, when the server 300 acquires the status information (the status information ST1 in this case) of the transmission source device in S382 and detects non-updated information in S390C, the server 300 determines that the connection status has changed from "incomplete" to "complete" (S396C: YES). When a YES determination is made in S396C, in S397C the server 300 transmits an instruction to the printer specified by the registering device RID in the non-updated information (the second printer 100B in this case) to stop transmitting the status information of the first printer 100A which is the transmission source device in S382. This instruction includes data on the device identification information IDD of the target printer for which the transmission of status information is to be stopped (the first device identification information IDD1 in this case).

In S398C, the second printer 100B excludes the printer specified in the instruction received from the server 300 (the first printer 100A specified by the first device identification information IDD1 in this case) from the target printers.

On the other hand, when the server 300 does not acquire the status information (the status information ST1 in this case) of the transmission source device in S382 or when the server 300 does not detect non-updated information in S390C (S396C: NO), the server 300 skips S397C. In this case, the second printer 100B does not execute S398C.

Thereafter, the first printer 100A and second printer 100B repeatedly execute steps S365 and S380, as in the example of FIG. 4. When the first printer 100A is excluded from the target printers in S398C of FIG. 7, thereafter the second printer 100B does not execute S365 and S384 for the first printer 100A.

Steps in S360C@2 performed by the second printer 100B as shown at the top of FIG. 7 are identical to those in S360C@1 performed by the first printer 100A. The initial S360C@2 following S320@2 is executed prior to S200@1. Accordingly, a NO determination is made in S396C of the initial S360C@2. Therefore, the initial S360C@2 is the same as S360 in FIG. 4.

In the third embodiment described above, the server 300 executes the following process. In S380 of S360C@1, the server 300 acquires the status information ST1 indicating the status of the first printer 100A from the first printer 100A without passing through any other printers 100 (i.e., without going through any other printers 100). When the status information ST1 is acquired directly from the first printer 100A in this way (S396C: YES), in S397C the server 300 transmits an instruction to the second printer 100B instructing the second printer 100B to stop transmitting the status information of the first printer 100A. In this embodiment, when the status information ST1 is acquired directly from the first printer 100A for the first time, the server 300 reaches a YES determination in S396C since non-updated information is detected in S390C. Thus, the server 300 can stop the second printer 100B from transmitting information on the first printer 100A which has completed a connection with the server 300. This configuration can reduce the communication load between the first printer 100A and the second printer 100B and between the second printer 100B and the server 300. This method can also reduce processing load on the first printer 100A, second printer 100B, and server 300.

D. Fourth Embodiment

Figure 8:
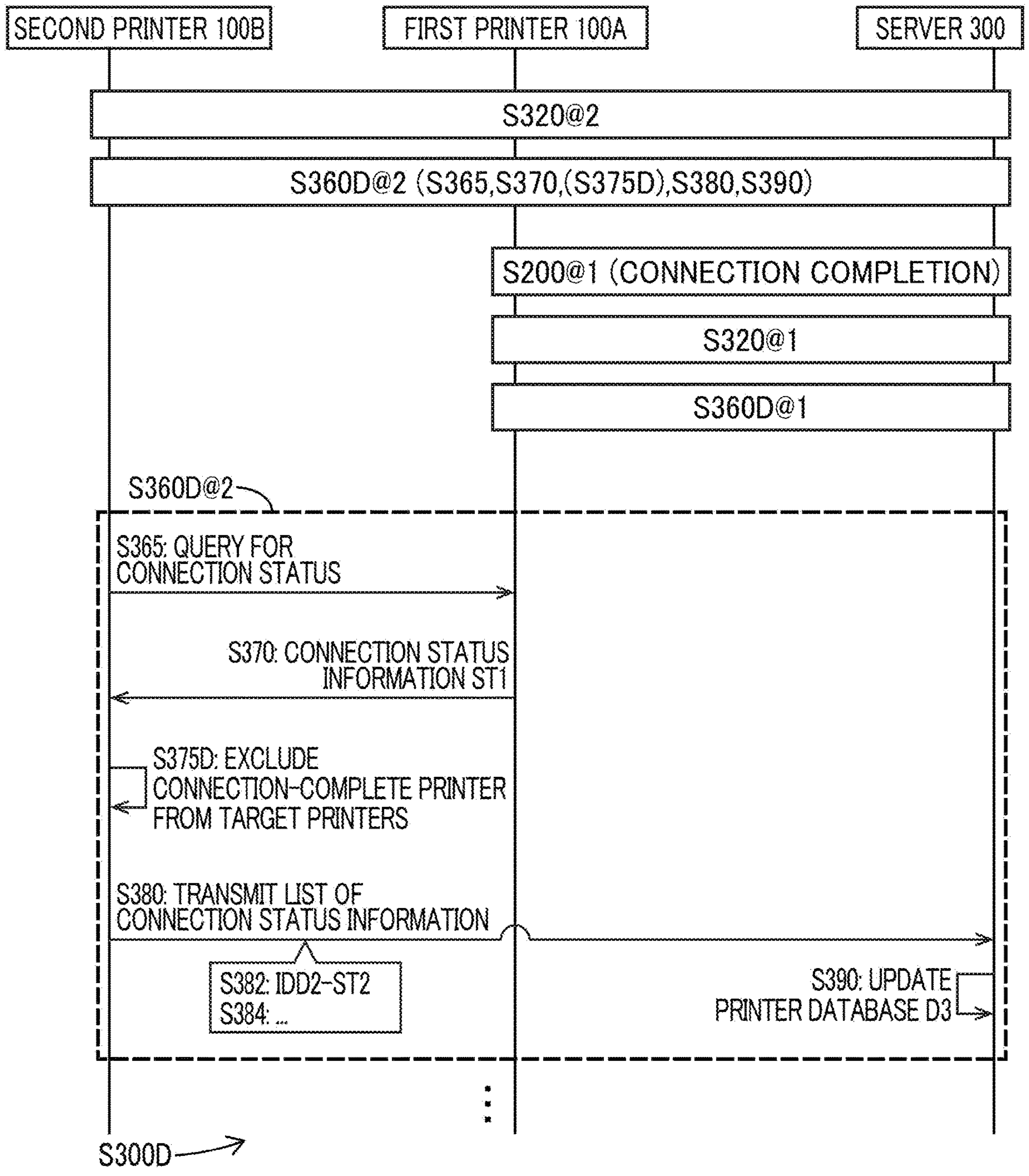
FIG. 8 is a sequence diagram illustrating another example of the collection-provision-updating process.

FIG. 8 is a sequence diagram showing a collection-provision-updating process S300D according to a fourth embodiment of the present disclosure. The collection-provision-updating process S300D differs from the collection-provision-updating process S300 in FIG. 4 only in the addition of a step S375D between S370 and S380. The remaining parts of the collection-provision-updating process S300D are identical to corresponding parts in the collection-provision-updating process S300 of FIG. 4 and, hence, a description of these parts has been omitted.

FIG. 8 shows the first printer 100A, second printer 100B, and server 300. The various steps shown in the diagram for the first printer 100A, second printer 100B, and server 300 are executed by the corresponding processors 110, 110, and 310. The act of these processors executing a process will also be described as the corresponding first printer 100A, second printer 100B, and server 300 executing the process. The following description will assume that the administrator changes the incorrect service information SI1$x$ of the first printer 100A to the correct service information SI1 following the connection processes S100 and S200 in FIG. 2, and subsequently the process of FIG. 8 is performed.

S320@2 is identical to S320 in FIG. 4. The second printer 100B detects the first printer 100A as a target printer. S360D@2 is equivalent to S360 in FIG. 4 with the changes described below. As will be described later, the initial S360D@2 following S320@2 is identical to S360 in FIG. 4. The subsequent processes S200@1 and S320@1 are identical to the processes S200@1 and S320@1 in FIG. 7, respectively. Here, the first printer 100A completes a connection with the server 300 (S200@1) and performs a process to identify target printers (i.e., printers that have not completed a connection to the server 300; S320@1). In some cases, any target printer may not be detected in S320@1. Following S320@1, the first printer 100A initiates a provision-updating process S360D@1. The differences between S360D@1 and S360 in FIG. 4 will be described later.

Following the execution of S360D@1 by the first printer 100A, the second printer 100B again initiates S360D@2. In S365 the second printer 100B transmits a connection status query to the target printer 100A. In S370 the first printer 100A transmits data specifying its own status information ST1 to the second printer 100B. At this stage, the status information ST1 indicates "complete".

When status information received from a target printer indicates "complete", in S375D the second printer 100B excludes this printer from the target printers. In the present embodiment, the first printer 100A is excluded from the target printers. When status information received from a target printer indicates "incomplete", the second printer 100B skips S375D for this target printer so as not to exclude this target printer from the target printers.

Subsequently, in S382 of S380 the second printer 100B transmits data specifying its own device identification information IDD2 and status information ST2 to the server 300. In S384 the second printer 100B transmits data specifying the device identification information and status information of target printers to the server 300. Since the first printer 100A has been excluded from the target printers (S375D), the second printer 100B does not transmit information on the first printer 100A.

Thereafter, the second printer 100B repeatedly executes S365, S375D (when necessary), and S380. In the initial S360D@2 following S320@2 at the top of FIG. 8, a connection between the first printer 100A and server 300 has not been completed. Therefore, the first printer 100A is not excluded from the target printers, and the second printer 100B transmits information on the first printer 100A to the server 300. Hence, the initial S360D@2 is identical to S360 in FIG. 4. Further, steps in S360D@1 performed by the first printer 100A are identical to those in S360D@2 performed by the second printer 100B.

In the fourth embodiment described above, the second printer 100B executes the following process. In the initial S360D@2 of FIG. 8 (and specifically S380), the second printer 100B transmits data specifying the status information ST1 of the first printer 100A to the server 300. After the second printer 100B has transmitted the status information ST1 of the first printer 100A to the server 300 in this way, the second printer 100B initiates S360D@2 a second time. In the second execution of S360D@2 (and specifically S365 and S370), the second printer 100B rechecks whether each target printer (the first printer 100A in this example) has completed a connection with the server 300. In other words, the second printer 100B performs an additional confirmation of whether each target printer (the first printer 100A in this example) has completed a connection with the server 300. When the second printer 100B confirms that the first printer 100A has completed a connection with the server 300 through this additional confirmation, in S375D the second printer 100B excludes the first printer 100A from the target printers. That is, the second printer 100B stops transmitting the status information ST1 of the first printer 100A. Thus, the second printer 100B no longer transmits information on the first printer 100A that has completed a connection with the server 300. This method can reduce the communication load between the first printer 100A and the second printer 100B and between the second printer 100B and the server 300. This method can also reduce processing load on the first printer 100A, second printer 100B, and server 300.

When a connection between the first printer 100A and server 300 has been completed through S200@1, the printer database D3 (see FIG. 3) may still contain non-updated information. For example, even after the first printer 100A has completed a connection with the server 300, the connection status ST in the information of the last line RL (the last record) still indicates "incomplete". When a connection between the first printer 100A and server 300 has been completed in S200@1, the server 300 preferably deletes the non-updated information from the printer database D3 in the present embodiment. For example, when authentication is successful in S220 of S200@1 (and generally the connection process S200 of FIG. 2), the server 300 may delete, from the printer database D3, non-updated information (a record) whose device identification information IDD is set to the device identification information IDD included in the connection request and whose connection status ST indicates "incomplete".

E. Variations of the Embodiments

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(1) In S392B of FIG. 6, the server 300 may transmit an instruction to the third printer 100C instructing the third printer 100C to stop transmitting status information not only for registered target printers but also for all printers other than the third printer 100C itself. After receiving this instruction, the third printer 100C may continue to repeat S382 (i.e., may transmits its own information IDD3 and ST3) without executing S384.

(2) In the above embodiments, a connection-complete printer, which has completed a connection with the server, transmits a request to other printers to transmit their connection status information (e.g., S365 in FIGS. 4, 6, 7, and 8) in coordination with transmitting its own status information (e.g., S382 in FIGS. 4, 6, 7, and 8). By transmitting this request, the connection-complete printer can obtain the latest connection status information from other printers indicating whether the other printers have completed a connection with the server 300 (S370). Here, when the timing of transmitting the request to transmit connection status information has a predetermined relationship with the timing of transmitting a device's own status information, the request to transmit connection status information can be said to be coordinated with the transmission of a device's own status information. For example, the request to transmit connection status information may be issued at a timing a prescribed amount earlier than the timing at which the device transmits its own status information.

(3) The process for requesting other printers to transmit their connection status information (e.g., S365 in FIGS. 3, 6, 7, and 8) may be performed by the connection-complete printer at any timing. For example, the connection-complete printer may transmit such a request to other printers in response to a user instruction inputted via the operating unit 150 or an instruction inputted into the connection-complete printer via the network from an external device (e.g., the terminal device 200).

Steps S365 and S370 may be omitted. In this case, the printers 100 extracted in S350 (FIG. 4, etc.) may be considered to be in the specific state, which is a state in which a connection with the server 300 has not been completed. In other words, the printers 100 extracted in S350 may be designated as target printers addressed in the process of S384.

(4) The printer 100 may attempt to connect to the server 300 in response to various triggers or at various timings, not just when the power to the printer 100 is turned on. For example, the printer 100 may attempt to connect to the server 300 in response to a user instruction inputted via the operating unit 150 or an instruction inputted into the printer 100 via the network from an external device (e.g., a user terminal device not shown in the drawings). In this case, the printer 100 may not have completed a connection with the server 300 due to an instruction-related issue (e.g., the user forgetting to input an instruction). Thus, the specific state used for determining whether to designate the printer 100 as the target printer addressed in S384 (FIG. 4, etc.) may simply be that the printer 100 has not completed a connection with the server 300, irrespective of whether the printer 100 has attempted to connect to the server 300. Any of various methods may be used to determine whether the printer 100 is in such a specific state. For example, the state of the first printer 100A may be determined to be the specific state when the first printer 100A has service information (e.g., the service information SI1*x*) and has not completed a connection to the server 300 (e.g., the status information ST1 indicates "incomplete").

(5) In the above embodiments, the status information transmitted in S384 (FIG. 4, etc.) may be any of various information representing the connection state indicated by the status information acquired in S370. For example, information obtained by processing the status information acquired in S370 may be transmitted in S384. Further, the transmission of a device's own status information may be omitted from step S380 (and specifically step S382 of S380). Further, the connection-complete printer may also execute S384 in response to various triggers or at various timings. For example, the connection-complete printer may execute S384 periodically or when the power to the printer is turned on.

(6) In the above embodiments, the connection-complete printer may execute S382 of FIG. 4 and the like (i.e., may transmit its own status information) in response to various triggers or at various timings. For example, the connection-complete printer may execute S382 in response to the power to the printer being turned on. The connection-complete printer may execute S365 after the power to the printer is turned on and prior to S382. Thus, the printer 100 may execute S365 in coordination with S382. In either case, the printer 100 preferably executes S384 (i.e., transmits status information on other printers) in response to executing S365.

(7) The reason for a failed connection between the printer 100 and server 300 is not limited to an error in the service information (e.g., the service information SI1*x*) but may be due to various other reasons such as a communication failure (e.g., an error in the default gateway settings). When the printer 100 cannot connect to the server 300 due to a communication failure, the printer 100 may set its status information and attempt flag as in S150 and S160 of FIG. 2. The connection-complete printer may then transmit information on such a printer 100 to the server 300 in S384 (FIG. 4, etc.). Note that the status information transmitted in S384 may include information indicating the type of failure (e.g., a communication failure or a failure to be authenticated by the server 300).

(8) In the example of FIG. 5A, the process for displaying the dashboard DB on the display 240 of the terminal device 200 may be implemented by a web browser rather than the management application. Further, the data for the dashboard DB may be outputted to various other devices instead of the terminal device 200. For example, the server 300 may be connected to a display device and may output data for the dashboard DB to this display device, thereby enabling the display device to display the dashboard DB. Further, the server 300 may output data for messages addressed to the administrator (including management information such as the dashboard DB). These messages may be sent by email or Short Message Service (SMS) technology. The messages may also be handled through a messaging system that transmits and receives information among a plurality of users.

(9) The protocol used to search for printers and obtain status information may be any of various protocols instead of SNMP. That is, other procedures established by the manufacturer or service provider of the printers 100 may be used to search for printers and acquire status information.

(10) Devices that communicate with the server 300 for services may be any of various other devices instead of the printers 100, such as multifunction peripherals, scanners, sewing machines, cutting machines, machine tools, smartphones, or surveillance cameras. The services provided using the server 300 may be any service such as the remote control of a device via the server 300.

(11) Any two or more embodiments selected from the plurality of embodiments described above may be combined. For example, the embodiment in FIG. 7 may be applied to another embodiment, such as the embodiment in FIG. 6 or FIG. 8. Similarly, the embodiment in FIG. 8 may be applied to another embodiment, such as the embodiment in FIG. 6 or FIG. 7. Alternatively, all three embodiments in FIGS. 6, 7, and 8 may be combined. Moreover, the above-described embodiments and variations can be suitably combined.

In the embodiments described above, part of the configuration implemented in hardware may be replaced with software and, conversely, all or part of the configuration implemented in software may be replaced with hardware. For example, the function of S340 in FIG. 4 and the like may be implemented with dedicated hardware circuitry.

When all or some of the functions in the present disclosure are implemented with computer programs, the programs may be provided in a state where the programs are stored on a computer-readable storage medium (a non-transitory storage medium, for example). The programs may be used in a state where the programs are stored in the same storage medium (a computer-readable storage medium) on which the programs were supplied. Alternatively, the programs may be used in a state where the programs are stored in a different storage medium (a computer-readable storage medium) to which the programs have been transferred. The "computer-readable storage medium" may be a portable storage medium, such as a memory card or CD-ROM; an internal storage device built into the computer, such as any of various ROM or the like; or an external storage device connected to the computer, such as a hard disk drive.

What is claimed is:

1. A system comprising:

a plurality of devices each connected to a network, the plurality of devices including a first device and a second device; and a server comprising a storage device, the server being configured to communicate over the network, the second device being configured to perform:

confirming, in a state where the second device has completed a connection with the server, whether each of one or more devices of the plurality of devices other than the second device has completed a connection with the server, the one or more devices including the first device; and transmitting, when the first device is in a specific state in which the first device has not completed a connection with the server, first device identification information and first status information to the server, the first device identification information being identification information for identifying the first device, the first status information indicating a status of the first device, the server being configured to perform:

storing, in response to acquiring the first device identification information and the first status information which are transmitted from the second device in the transmitting, the acquired first device identification information and the acquired first status information in the storage device in association with administrator identification information associated with the second device, the administrator identification information associated with the second device being identification information for identifying an administrator associated with the second device, wherein the specific state is a state in which the first device has failed in an attempt to connect to the server.

2. The system according to claim 1, wherein, in response to completion of a connection between the second device and the server, the confirming is initiated by the second device at a time after the completion of the connection.

3. The system according to claim 1, wherein the first device is configured to perform:

transmitting first connection status information to one or more devices of the plurality of devices other than the first device, the first connection status information indicating a first connection status, the first connection status being a connection status of the first device with the server, the one or more devices to which the first connection status information is transmitted by the first device including the second device, and wherein the first status information transmitted by the second device indicates, as the status of the first device, the first connection status indicated by the first connection status information received from the first device.

4. The system according to claim 3, wherein the second device is configured to further perform:

transmitting second connection status information to the server, the second connection status information indicating a second connection status, the second connection status being a connection status of the second device with the server; and requesting, in coordination with the transmitting the second connection status information, the first device to transmit the first connection status information to the second device.

5. The system according to claim 3, wherein the plurality of devices further includes a third device, wherein the third device is configured to repeatedly perform:

transmitting, when the first device is in the specific state, third status information to the server, the third status information indicating a status of the first device, and wherein the server is configured to further perform:

transmitting, in response to acquiring the third status information from the third device after acquiring the first status information from the second device, an instruction to the third device to instruct the third device to stop the transmitting the third status information.

6. The system according to claim 4, wherein the server is configured to further perform:

outputting display information, the display information being information for displaying management information, the management information including:

the first connection status of the first device that has not completed a connection with the server; and the second connection status of the second device that has completed a connection with the server.

7. The system according to claim 1, wherein the transmitting is repeatedly performed by the second device, and wherein the server is configured to further perform:

transmitting, in response to acquiring status information on the first device from the first device without passing through any of the plurality of devices other than the first device, an instruction to the second device to instruct the second device to stop the transmitting the first status information.

8. The system according to claim 1, wherein the transmitting is repeatedly performed by the second device, and wherein the second device is configured to further perform:

executing, after transmitting the first status information to the server in the transmitting, an additional confirmation of whether the first device has completed a connection with the server; and stopping, in response to confirming by the additional confirmation that the first device has completed a connection with the server, the transmitting the first status information.

9. A device comprising:

a controller configured to perform:

confirming, in a state where the device has completed a connection with a server configured to communicate over a network, whether each of one or more other devices connected to the network has completed a connection with the server, the one or more other devices including a first device; and transmitting, when the first device is in a specific state in which the first device has not completed a connection with the server, first device identification information and first status information to the server, the first device identification information being identification information for identifying the first device, the first status information indicating a status of the first device, wherein the specific state is a state in which the first device has failed in an attempt to connect to the server.

10. A method of managing a plurality of devices each connected to a network, the plurality of devices including a first device and a second device, the method comprising:

confirming, in a state where the second device has completed a connection with a server configured to communicate over the network, whether each of one or more devices of the plurality of devices other than the second device has completed a connection with the server, the one or more devices including the first device;

transmitting, when the first device is in a specific state in which the first device has not completed a connection with the server, first device identification information and first status information from the second device to the server, the first device identification information being identification information for identifying the first device, the first status information indicating a status of the first device; and storing the transmitted first device identification information and the transmitted first status information in a storage device of the server in association with administrator identification information associated with the second device, the administrator identification information associated with the second device being identification information for identifying an administrator associated with the second device, wherein the specific state is a state in which the first device has failed in an attempt to connect to the server.

* * * * *